United States Patent [19]
Malzbender

[11] Patent Number: 5,724,435
[45] Date of Patent: Mar. 3, 1998

[54] DIGITAL FILTER AND METHOD OF TRACKING A STRUCTURE EXTENDING IN THREE SPATIAL DIMENSIONS

[75] Inventor: Thomas Malzbender, Mountain View, Calif.

[73] Assignee: Hewlett Packard Company, Palo Alto, Calif.

[21] Appl. No.: 769,179

[22] Filed: Dec. 18, 1996

Related U.S. Application Data

[63] Continuation of Ser. No. 548,606, Oct. 26, 1995, abandoned, which is a continuation of Ser. No. 228,042, Apr. 15, 1994, abandoned.

[51] Int. Cl.$^6$ .............................. G06K 9/00; G06K 9/40
[52] U.S. Cl. ..................... 382/103; 382/154; 382/260; 382/261
[58] Field of Search ......................... 382/260, 261, 382/262, 103, 154; 358/339; 364/413.13

[56] References Cited

U.S. PATENT DOCUMENTS

| | | | |
|---|---|---|---|
| 4,742,557 | 5/1988 | Ma | 382/54 |
| 4,875,165 | 10/1989 | Fencil et al. | 364/413 |
| 4,956,869 | 9/1990 | Miyatake et al. | 382/60 |
| 5,023,920 | 6/1991 | Breu | 382/60 |
| 5,121,191 | 6/1992 | Cassereau et al. | 358/339 |
| 5,150,292 | 9/1992 | Hoffmann et al. | 364/413.07 |
| 5,237,646 | 8/1993 | Bunce | 382/54 |
| 5,271,064 | 12/1993 | Dhawan et al. | 382/54 |
| 5,283,837 | 2/1994 | Wood | 382/54 |
| 5,369,678 | 11/1994 | Chiu et al. | 364/413.13 |
| 5,454,371 | 10/1995 | Fenster et al. | 395/119 |

OTHER PUBLICATIONS

Bao, Y. and Stiehl, H.S., "The Epipolar Line constraint for Precise Biplane Angiogram Analysis", IEEE, 1992, pp. 485–488.

Liu, Iching and Sun, Ying, "Recursive Tracking of Vascular Networks in Angiograms Based on the Detection–Deleti on Scheme", IEEE, 1993, pp. 334–341.

Niki, Noburo et al., "3–D Imaging of Blood Vessels using X–ray Rotational Angiographic System", IEEE, 1993, pp. 1873–1877.

Sun, Yung–Nien et al., "The Computer Image Analysis for the 2–D Coronary Arteriograms", IEEE, 1993, pp. 978–982.

Alperin, N. et al., "Automated Analysis of Coronary Lesions . . . ", 1990, IEEE, pp. 153–156.

Hoffman, K. R., "Automated Three–Dimensional Vascular . . . ", IEEE Engineering in Medicine & Biology Society 10th Annual International Conference, 1988.

Kitamura, K. et al., "Estimating the 3–D Skeletons . . . ", IEEE Transactions on Medical Imaging, vol. 7, No. 3, Sep. 1988, pp. 173–187.

Selzers, R. H. et al., "Computer–Generated 3D Ultrasound Images of the Carotid Artery", 1989 IEEE, pp. 21–26.

Sun, Ying, "Automated Identification of Vessel Contours in Coronary Arteriograms . . . ", IEEE Transactions on Medical Imaging, vol. 8, No. 1, Mar. 1989, pp. 78–88.

(List continued on next page.)

Primary Examiner—Jose L. Couso
Assistant Examiner—Matthew C. Bella

[57] ABSTRACT

A tracking technique which tracks a structure in three-dimensional data is disclosed. The tracking technique uses a geometric shape to model the structure to be tracked. Tracking is achieved by altering the orientation (and perhaps scale) of the geometric shape at a given three-dimensional point until it best fits the structure being tracked. Using this best fit information, a subsequent point within the structure being tracked can be identified. The tracking continues by thereafter altering the orientation (and perhaps scale) of the geometric shape at or near the subsequent point until a best fit is identified. The invention can be implemented as a digital filter, a tracking system or a method.

22 Claims, 6 Drawing Sheets

OTHER PUBLICATIONS

Chaudhuri et al., "Detection of Blood Vessels in Retinal Images Using Two-Dimensional Matched Filters", IEEE Transactions on Medical Imaging, vol. 8, No. 3, Sep. 1989, pp. 263–269.

Hoffmann et al., "Automated Tracking and Computer Reproduction of Vessels in DSA Images", Investigative Radiology, vol. 25, Oct. 1990, pp. 1069–1075.

Saito, T., et al., "Three-Dimensional Quantitative Coronary Angiography", IEEE, 1990, pp. 768–777.

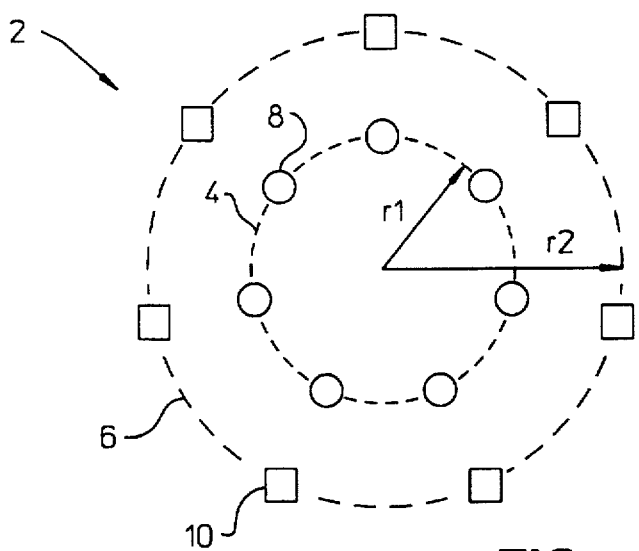
FIG. 1
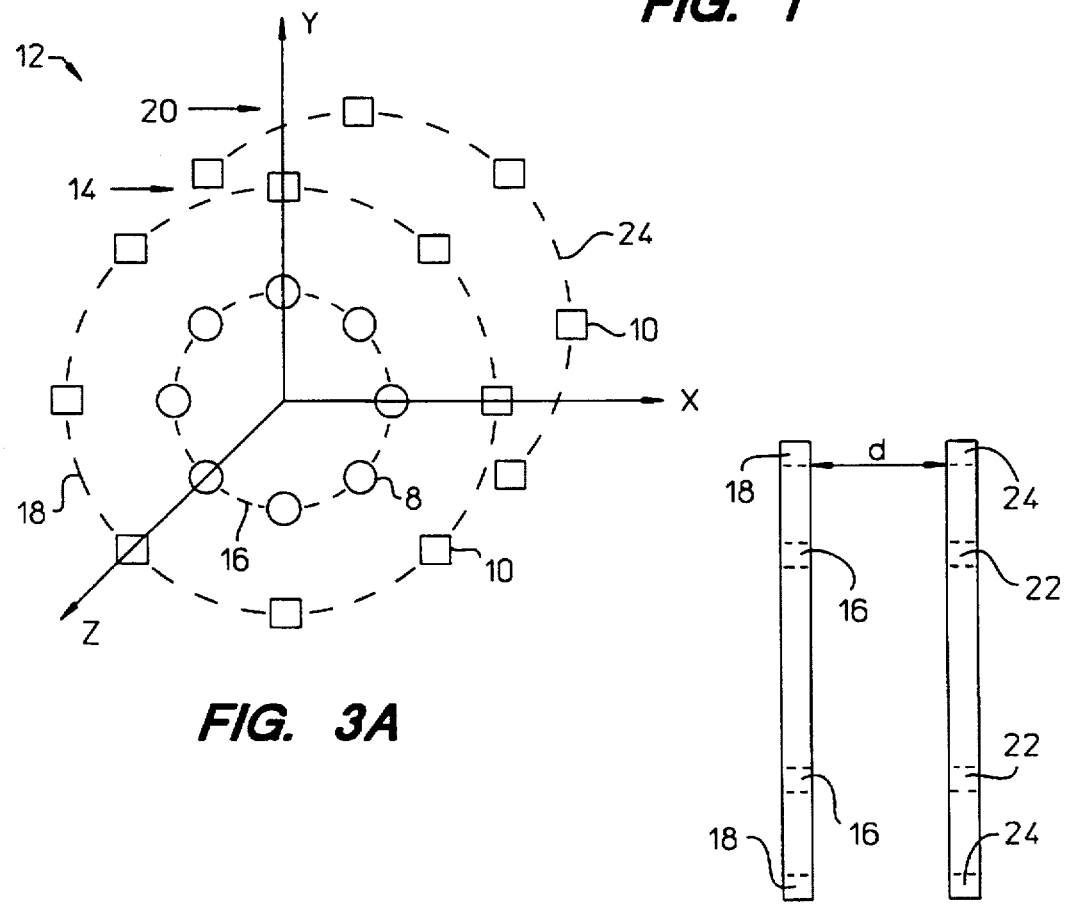
FIG. 3A
FIG. 3B

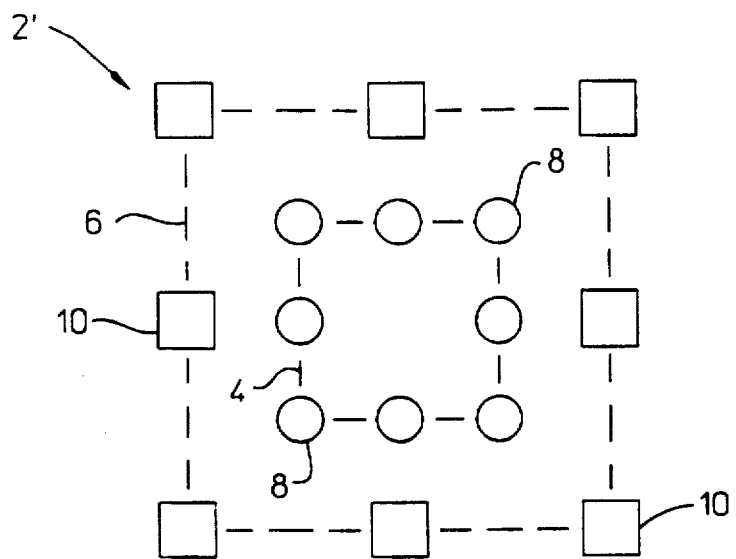
FIG. 2
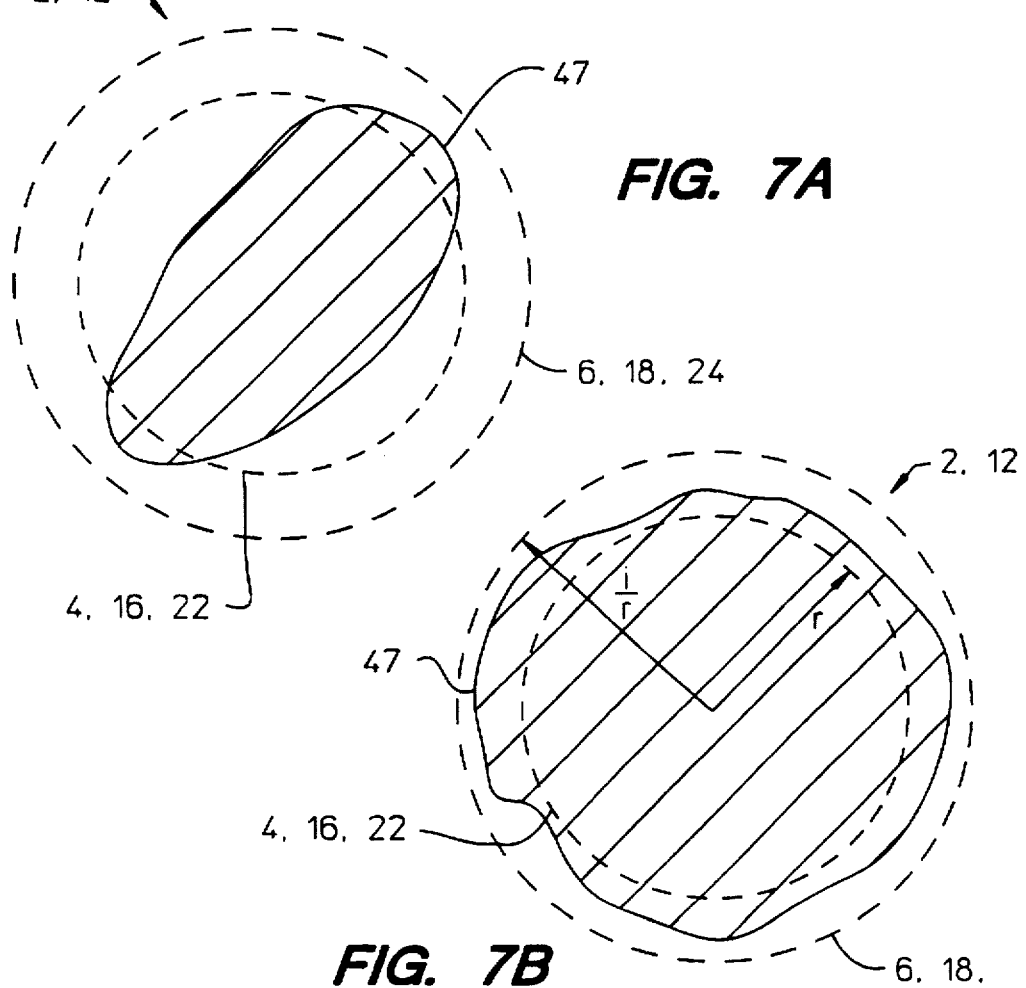
FIG. 7A
FIG. 7B

DIGITAL FILTER AND METHOD OF TRACKING A STRUCTURE EXTENDING IN THREE SPATIAL DIMENSIONS

CROSS REFERENCE TO RELATED APPLICATION

This is a continuation of application Ser. No. 08/548,606 filed on Oct. 26, 1995, now abandoned; which is a continuation of application Ser. No. 08/228,042 filed on Apr. 15, 1994, now abandoned.

BACKGROUND OF THE INVENTION

1. Field of the Invention

The present invention relates to automated tracking techniques and, more particularly, to a method and apparatus for tracking structures in three-dimensional data.

2. Description of the Related Art

In using three-dimensional data, images of many structures do not remain in a given two-dimensional plane. As a result, when viewing three-dimensional data on a conventional computer screen, it is difficult to identify and trace these structures within the three-dimensional data.

Tracking approaches are known, but these known tracking approaches operate only on two-dimensional data. See, Hoffmann et al., *Automated Tracking and Computer Reproduction of Vessels in DSA Images*, Investigative Radiology, vol. 25, pp. 1069–75, October, 1990; and Chaudhuri et at., *Detection of Blood Vessels in Retinal Images Using Two-Dimensional Matched Filters*, IEEE Transactions on Medical Imaging, Vol. 8, No. 3, pp. 263–269, September 1989. Even assuming the known tracking approach tracks the structure correctly in two-dimensional data, the images produced from the two-dimensional data are inferior to those images that would be produced by three-dimensional data.

Three-dimensional data offers significantly more information to a user than does two-dimensional data. This additional dimension makes the images eventually displayed more meaningful to the user. One type of three-dimensional data is magnetic resonance imaging (MRI) data which is used by doctors for diagnosis of patients. MRI data is becoming useful in the diagnosis and treatment of blockages existing in a patient's coronary arteries.

Consider for example the problem of tracking or viewing arteries. Currently, a medical doctor's diagnosis is made by viewing only a single (two-dimensional) slice of MRI data at a time. Although the particular slice of data is accurate, it is difficult for the doctor to accurately evaluate the health of the coronary arteries because only discrete slices of data can be viewed one at a time. Although a doctor can switch back and forth between slices in an attempt to follow an artery, the data displayed is confusing and difficult to interpret because there is no information as to what happens to the artery between such data slices. Also, due to the interplay of various images, locating the artery being evaluated in each slice of data is difficult. Hence, the doctor's diagnosis is hindered because three-dimensional tracking in unavailable to assist the doctor by identifying and/or extracting the relevant data concerning the structure being tracked.

Thus, since known tracking techniques are not suitable for tracking in three-dimensional data, there is a need for a technique to track structures, such as arteries, within three-dimensional data so that the artery or other tracked structure can be identified or isolated from other three-dimensional data.

SUMMARY OF THE INVENTION

Broadly speaking, the invention relates to a tracking technique which tracks a structure in three-dimensional data. Generally, the tracking technique uses a geometric shape to model the structure to be tracked. Tracking is achieved by altering the orientation (and perhaps scale) of adapting the geometric shape at a given three-dimensional point until it best fits the structure being tracked. Using this best fit information, a subsequent point within the structure being tracked can be identified. The tracking continues by thereafter altering the orientation (and perhaps scale) of the geometric shape at or near the subsequent point until a best fit is identified. The invention can be implemented as a digital filter, a tracking system or a method.

As a digital filter, the invention includes a set of filter coefficients arranged in a predetermined geometric shape, and transformation means for altering at least the orientation of the geometric shape of the set of filter coefficients about a central three-dimensional location in three-dimensional data to identify at least an orientation corresponding to a maximized filter response. The transformation means may also alter a scale of the geometric shape.

As a digital filtering system for tracking a structure in three-dimensional data, the invention includes geometric transformation means for transforming three-dimensional data to six-dimensional data, and a controller for controlling the geometric transformation means to produce a maximized response. The six-dimensions include a three-dimensional location, a scale dimension and a two-dimensional orientation. In seeking the maximized response, the controller controls the geometric transformation means so as to alter the two-dimensional orientation at a predetermined three-dimensional location within the structure, and identifies the two-dimensional orientation that yields the maximized response. The two-dimensional orientation identified can then be used to find additional locations within the structure. The controller may also alter the scale dimension at the predetermined three-dimensional location and then identify the maximized response based on both the two-dimensional orientation and the scale dimension.

As a method, the invention tracks a structure in three-dimensional data using a predetermined geometric shape. The tracking method begins by identifying a predetermined geometric shape which approximates the geometric shape of the structure to be tracked in the three-dimensional data. Next, a medial axis point for the structure to be tracked is approximated. Then an orientation of the structure at the medial axis point is approximated using the predetermined geometric shape. Once the orientation is approximated, a next medial axis point for the structure is approximated based on the previous medial axis point and the orientation.

The invention offers numerous advantages as compared with the prior art. Namely, the invention provides a tracking technique that is suitable for tracking structures in three-dimensional data. The invention also facilitates easy identification and/or isolation of tracked structures throughout three-dimensional data.

BRIEF DESCRIPTION OF THE DRAWINGS

The invention will be readily understood by the following detailed description in conjunction with the accompanying drawings, wherein like reference numerals designate like structural elements, and in which:

FIG. 1 is a schematic diagram of a spatial filter according to the invention;

FIG. 2 is a schematic diagram of an alternative configuration of the spatial filter according to the invention;

FIG. 3A is a perspective view of a spatial filter according to the invention;

FIG. 3B is a side view of the spatial filter illustrated in FIG. 3A;

FIGS. 7A and 7B are schematic diagrams illustrating differing alignments of the spatial filter with respect to a structure being tracked.

DETAILED DESCRIPTION OF THE INVENTION

Figure 4:
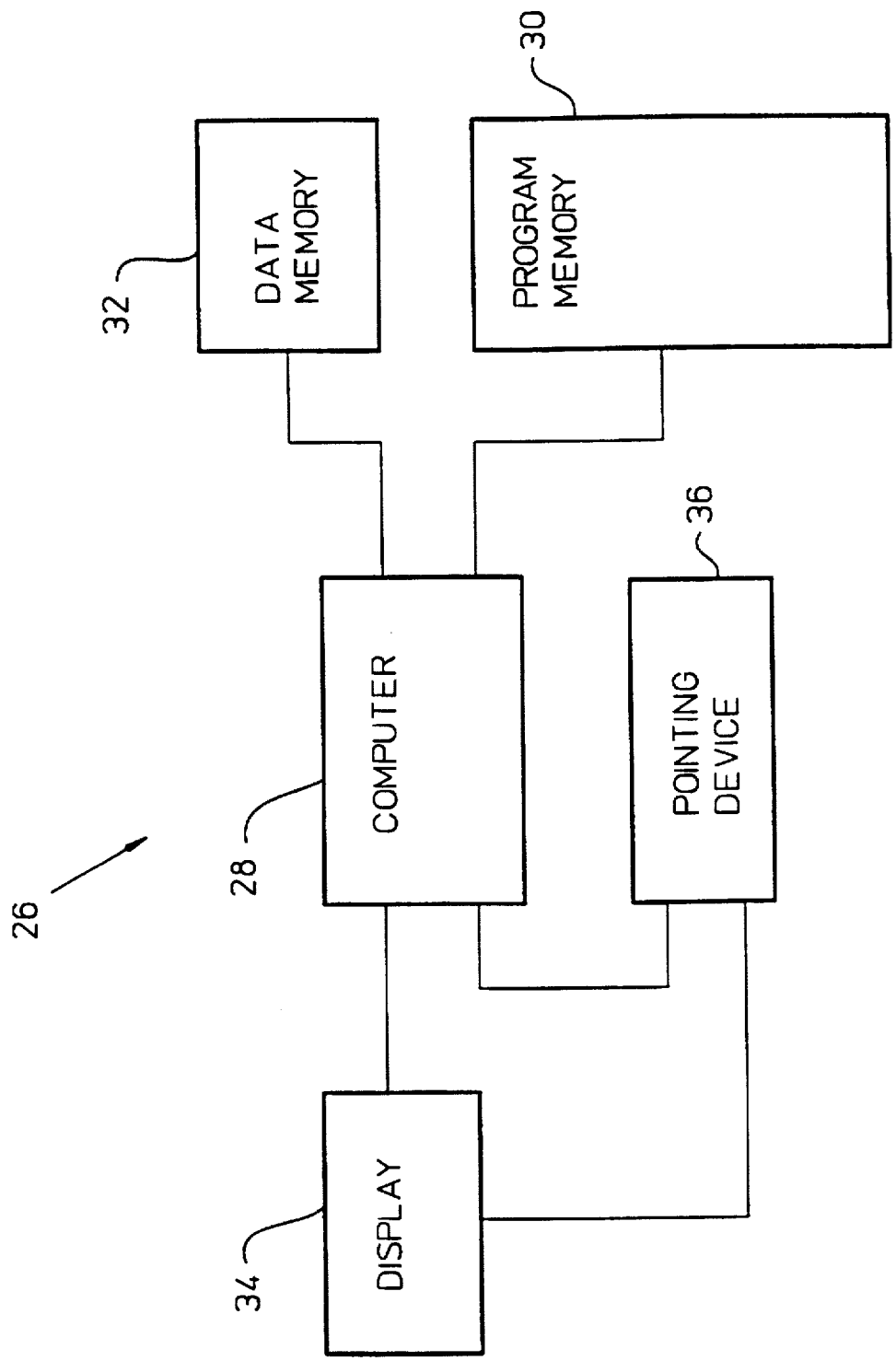
FIG. 4 is a block diagram of a tracking system according to the invention.

Embodiments of the invention are discussed below with reference to FIGS. 1–8. However, those skilled in the art will readily appreciate that the detailed description given herein with respect to these figures is for explanatory purposes as the invention extends beyond these limited embodiments.

The invention relates to a tracking technique which tracks a structure in three-dimensional data. The tracking technique uses a geometric shape to model the structure to be tracked. Tracking is achieved by adapting the geometric shape at a given three-dimensional point within the structure being tracked until the geometric shape best fits the structure being tracked. Using this "best fit" information a subsequent point within the structure being tracked can be identified. The geometric shape is then adapted at or near the subsequent point until a best fit is identified. Note, the geometric shape used for tracking does not necessarily have the same shape as that of the structure being tracked.

The three-dimensional data can be of a variety of types. For example, the data type may be MRI data. It should be noted that typically MRI data is discrete data which forms a matrix-like volume in three-dimensions. The invention, however, preferably and more precisely operates on continuous data by interpolating from the matrix points of the discrete MRI data.

The "best fit" information is obtained from a digital filter and a transformation matrix. The digital filter is configured in the geometric shape which models the structure being tracked. Transformation matrixes are a conventional computer graphics technique. See, Foley and Van Dam. *Fundamentals of Interactive Computer Graphics*, Section 7.5, 1982.

The "best fit" information is obtained for a given three-dimensional point within the structure being tracked. The "best fit" is determined using filter responses which are an indication of whether the digital filter (as transformed by the transformation matfix) is properly aligned with the structure being tracked. Various responses are obtained for different alignments. Based on the responses, the invention determines the orientation of the structure at the given three-dimensional point within the three-dimensional data. In effect, the orientation chosen is that which corresponds to the greatest response (i.e., "best-fit" information). A next point within the structure is thereafter determined using the previous point as well as the orientation of the structure at the previous point. After obtaining orientations of the structure at various adjacent but separated points in the three-dimensional data, the points can be visually linked together or otherwise distinguishably displayed so that the user can easily follow the structure through the three-dimensional data.

FIG. 1 is a schematic diagram of a spatial filter 2. A spatial filter 2 is a two or three dimensional digital filter. The spatial filter 2 includes a first ring 4 of radius r1 and a second ring 6 of radius r2. The first ring 6 is illustrated as having seven filter coefficients 8 (each coefficient being represented by a small circle), and the second ring 6 is illustrated as having seven filter coefficients 10 (each coefficient being represented by a small square). The first ring 4 and the second ring 6 are coplanar. Although FIG. 1 illustrates the filter coefficients 8, 10 as having a small area or volume, the filter coefficients 8, 10 actually operate at points, which are referred to as sample points. Moreover, the number of filter coefficients 8, 10 can vary depending on the accuracy desired and the processing time available.

Although the rings 4 and 6 of the spatial filter 2 illustrated in FIG. 1 are circular rings, other shapes may be used. As an example, FIG. 2 is a schematic diagram of a spatial filter 2' which arranges the filter coefficients 8, 10 in squares, not rings. Ultimately, the geometric shape in which the coefficients are arranged should model the structure being tracked.

The following discussion will concentrate on the spatial filter 2 illustrated in FIGS. 1 and 3A because an important application or use of the invention is to track arteries which have a tubular structure. In which case, the spatial filter preferably has a geometric shape which is circular or tubular so as to model arteries.

FIGS. 3A and 3B are views of a spatial filter 12 which is preferable for tracking arteries. The spatial filter 12 is preferable for searching for arteries because the filter itself has a tubular structure thus making it more computationally efficient and accurate in tracking arteries. The spatial filter 12 includes a first tier 14 which includes an inner ring 16 and an outer ring 18. These rings 16, 18 are constructed as are the rings 4 and 6 shown in FIG. 1. That is, each ring 16, 18 consists of filter coefficients 8, 10 arranged in a ring. The spatial filter 12 also includes a second tier 20 which includes similar rings 22 and 24. The first tier 14 is separated from the second tier 20 by a distance d. The radii r are preferably 0< r <1 with the inner ring having a radius r and the outer ring having a radius of 1/r. The actual radius of the rings of the filter are scaled to the desired size in accordance with this relationship.

Preferably, when tracking arteries the filter coefficients 8, 10 have a value of one and have opposite signs. For example, with a bright blood MRI data, the filter coefficients 8 would be +1 and the filter coefficients 10 would be −1. The response R of the spatial filter 12 at the three-dimensional point (x,y,z) as oriented as shown in FIG. 3A is computed by the following equation.

$$R(x,y,z) = \sum_i^M \sum_j^2 [\delta(x - \gamma\cos(2\pi i/M))\delta(y - \gamma\sin(2\pi i/M))\delta(z - j + 1/2) -$$

$$\delta(x - \gamma^{-1}\cos(2\pi i/M))\delta(y - \gamma^{-1}\sin(2\pi i/M))\delta(z - j + \frac{1}{2})]$$

where $\delta$ is a delta function, which takes on a value of 1.0 if its argument is zero, otherwise it takes on a value of zero; $\gamma$ is the radius of the inner ring; $\gamma^{-1}$ is the radius of the outer ring; and M is the number of coefficients in a tier. The equation for the case where there are two tiers.

FIG. 4 is a block diagram of a tracking system according to the invention. The tracking system 26 includes a computer 28 which controls operation of the system 26. The computer 28 can be a computer, a microprocessor, or other circuitry. The computer 28 is connected to a program memory 30 which stores a tracking program to be executed by the computer 28. The tracking program performs the filtering and transformation operations which are discussed in detail below with regard to FIGS. 5 and 6. The computer 28 is also connected to a data memory 32. The data memory 32 stores the three-dimensional data. For example, the three-dimensional data may be MRI data. The computer 28 is further connected to a display 34 and a pointing device 36. The display 34 is useful to display a portion of the three-dimensional data as is pertinent to the tracking or the extraction of the geometric shape being tracked. The pointing device 36 is used by user to select a structure to be tracked from that which is shown on the display 34. The pointing device 36 can include a variety of devices including a mouse, cursor buttons, or a track ball.

Figure 5:
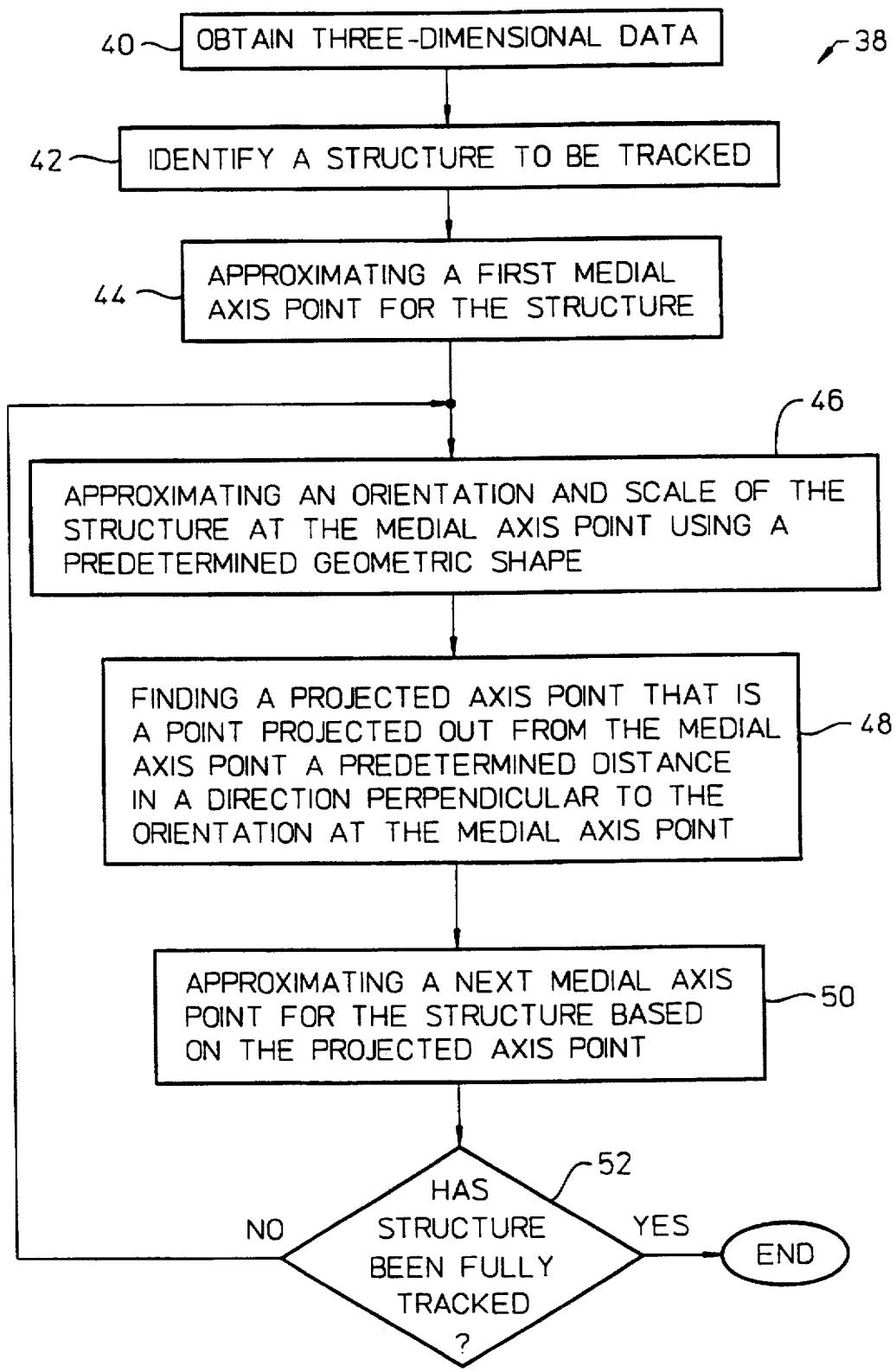
FIG. 5 is a flow chart of a basic embodiment of a method according the invention.

FIG. 5 is flow chart of a basic embodiment of a tracking method according to the invention. The tracking method 38 illustrated in FIG. 5 includes a number of operations.

Initially, a dataset of three-dimensional data is obtained 40. The dataset can be held in a data memory 32. Next, a structure to be tracked is identified 42. For example, in accordance with FIG. 4, a user would use the pointing device 36 to indicate on the display 34 a particular structure within the three-dimensional data which the user desires to track through the dataset. As an example, the structure identified 42 might be a coronary artery.

Once the structure is identified 42, a first medial axis point for the structure is approximated 44. For an artery, the first medial axis point could be selected by a user via the pointing device 36 to roughly approximate 44 the center of the artery. In this case, the identifying 42 and the approximating 44 could be performed by a single user action. Alternatively, the technique could be enhanced by having the tracking program approximate 44 the first medial axis point for the structure.

Once the first medial axis point has been approximated 44, an orientation and scale of the structure at the medial axis point can be approximated 46 using a predetermined geometric shape. This approximation 46 is carried out by the computer 28 as it executes the tracking program. The tracking program includes executable code to implement the spatial filter and a transformation matrix.

The spatial filtering performed by the tracking program performs the spatial (digital) filtering using a predetermined geometric shape. For example, for tracking arteries, the predetermined geometric shape would be circular or tubular (see spatial filter 2, 12).

The transformation matrix implemented by the tracking program varies three-degrees of freedom of the predetermined geometric shape at a three-dimensional location within the structure so that a maximized response can be identified. In effect, the transformation matrix operates to rotate the spatial filter about the three-dimensional location. At each of many discrete different orientations, the filter response is measured. Once filter responses for a predetermined number of orientations have been obtained, the tracking program selects the orientation of the structure being tracked to be the orientation of the spatial filter yielding the maximized response.

Figure 8:
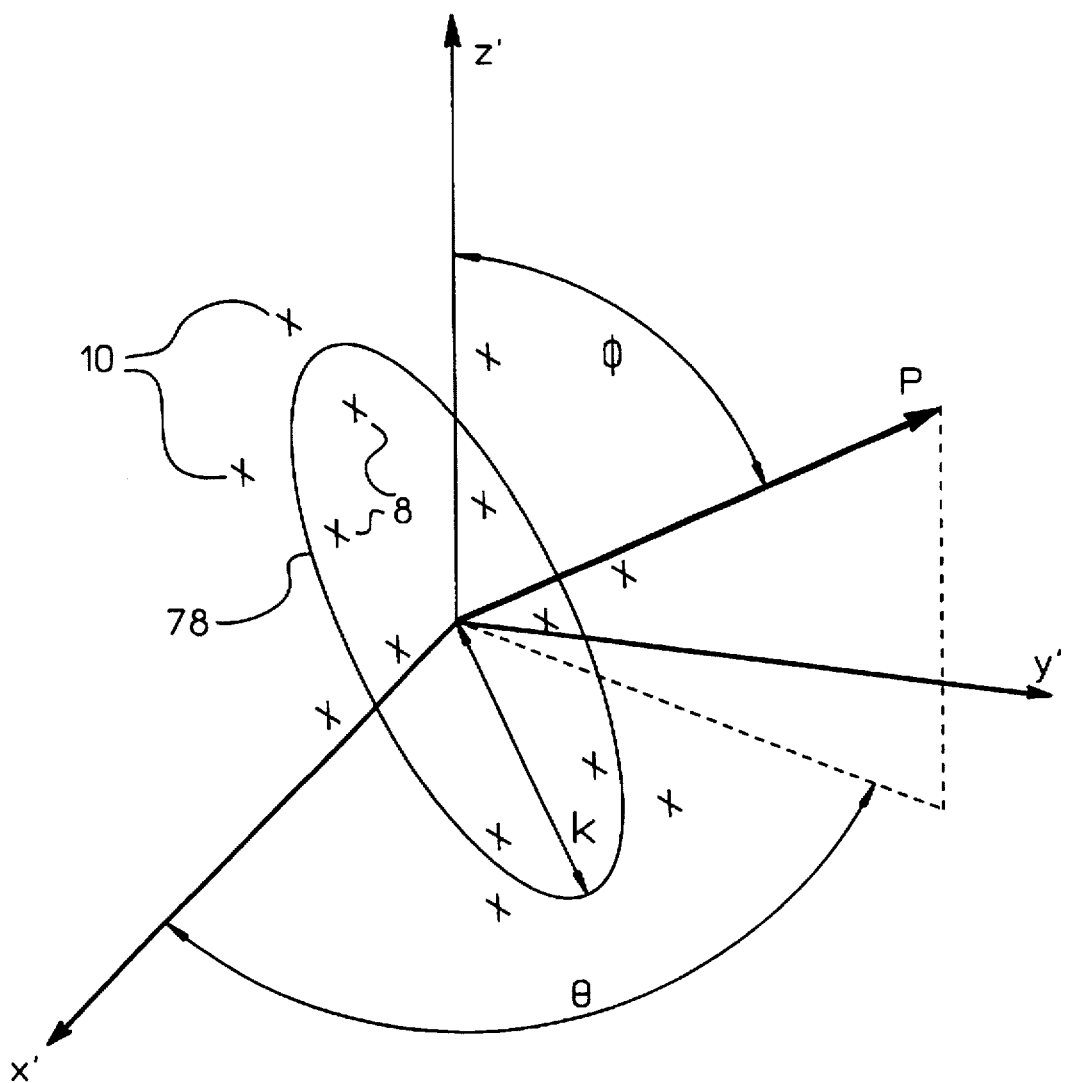
FIG. 8 is a perspective view of a spacial filter yielding an orientation and a scale for the tracked structure at a three-dimensional location.

The transformation operates to approximate three-degrees of freedom of the spatial filter at a three-dimensional location. In total, the tracking program controls six degrees of freedom. FIG. 8 is a perspective view of a one-tier spatial filter in a transformed orientation. The three-dimensional location within the structure represents three dimensions (e.g., the origin of the x',y',z' coordinate system) and the other three degrees of freedom (determined by the transformation means) are the two angles in spherical coordinates, theta ($\theta$) and phi ($\phi$), and a scale ($\kappa$). In the case of tracking arteries, ring 78 represents the orientation and scale of the artery being tracked at the particular three-dimensional location.

The spherical coordinates specify the orientation of the structure as estimated by the predetermined geometric shape. In a circular or tubular geometric shape, the scale corresponds to radius. Thus, once the maximized response is identified, the tracking program determines or approximates the radius and orientation of the structure at the first medial axis point. Of course, if the scale is uniform in the structure being tracked, the scale need not be varied in searching for the maximized response.

Given that the spatial filter must be placed at the three-dimensional location, the spatial filter must be translated from the base coordinate system (x,y,z) to the coordinate system having as its origin the three-dimensional location (x',y',z'). The tracking program implements this translation operation with a translation matrix. However, it is preferred that the transformation matrix incorporate both the translation and the rotation (orientation) operations. The preferred combined matrix is then as follows.

$$\begin{bmatrix} \kappa\cos(\phi)\cos(\theta) & \kappa\cos(\phi)\sin(\theta) & -\kappa\sin(\phi) & 0 \\ \kappa\sin(\theta) & \kappa\sin(\phi) & 0 & 0 \\ \kappa\sin(\phi)\cos(\theta) & \kappa\sin(\phi)\sin(\theta) & \kappa\cos(\phi) & 0 \\ x' & y' & z' & 1 \end{bmatrix}$$

As discussed above, the three-dimensional data can be MRI data. Typical MRI data has twelve (12) bit values for its intensity distributions. Processing can be simplified by normalizing the MRI data to smaller data values. For example, by normalizing the MRI data to values between 0 and 255, only eight bit values would be necessary; however, some loss of resolution would result. Further, when the dataset is a bright blood MRI dataset and the filter coefficients 8, 10 are +1 and −1, respectively, then the response obtained (from spatial filter and transformation matrix) is preferably computed as follows. The response is the sum of the products of the filter coefficients 8, 10 and the intensity values of the data at the sample points (i.e., the three-dimensional locations of the filter coefficients). As mentioned, the intensity values at the sample points represent those of continuous data because interpolation (from nearest matrix points) is used to accurately estimate the actual value. As a result, when the scale and orientation of the spatial filter 2, 12 are properly aligned with the structure being tracked, the response will be maximized because the additive value from the inner ring 4, 16 and 22 will be large and the subtractive value of the outer ring will be small.

In general, the tracking program operates to check numerous radius sizes and numerous orientations and then selects the radius and corresponding orientation which yields the maximized filter response. When the response is maximized, the scale represents the radius of the wall because the actual artery wall would be between the inner ring and the outer ring. FIGS. 7A and 7B are schematic diagrams which help illustrate the differing responses. In FIG. 7A a cross-section of an artery 47 a some three-dimensional location is shown. Although the inner ring 4, 16 and 22 and the outer ring 6, 18 and 24 are scaled properly to the artery 47, the orientation of the filter 2, 12 is skewed by about 20–30 degrees in one or two angular dimensions. FIG. 7B shows the situation in which the filter 2, 12 is properly scaled and aligned with the artery 47. FIG. 7B also shows the preferred relationship of the radii of the inner and outer rings when tracking arteries, namely the inner radius is r and the outer radius is 1/r, where 0< r <1.

One should note that the filter response in FIG. 7A will be substantially smaller than the filter response in FIG. 7B. The reason for the difference in this example is not the outer ring which obtains a similar response in both cases, but is the inner ring because most filter coefficients for the inner ring in FIG. 7A fall on a low intensity value, whereas these same coefficients fall on a high intensity value in FIG. 7B. Also note that it is desirable to require that the maximum response value exceed a certain threshold, this will indicate sufficient alignment. When the maximum response value becomes very low, the artery or other structure has ended, or the data is corrupted by large amounts of noise.

In any case, once the orientation and scale of the structure at the medial axis point are approximated 46, it is necessary to track the structure to a subsequent position. Specifically, a next medial axis point for the structure is approximated 48 based on the previous medial axis point and the orientation.

The next medial axis point can be determined or approximated as follows. First, by projecting out from the medial axis point a predetermined distance in a direction along the medial axis, a projected axis point is found 48. One way this can be achieved is by projecting the predetermined distance out from the medial axis point in the direction which is perpendicular to the plane in which the orientation resides. Well known vector approaches can be used to make the projection. Second, the next medial axis point for the structure being tracked can then be approximated 50 based on the projected axis point. For example, using the projected axis point as a rough approximation of the position of the position of the next medial axis point, a constrained search can be performed in the near vicinity of the projected axis point. The point which yields the maximized filter response is chosen as the next medial axis point. This searching would involve checking the orientation and radius of various points in the near vicinity of the projected axis point. Using this approach, the maximized filter response then yields not only the next medial axis point, but also the scale and orientation for the next medial axis point, thereby combining the operations of blocks 46 with those of block 50.

Blocks 46 through 50 thereafter repeat for each subsequent axis point for the structure until a decision block 52 determines that the structure has been fully tracked. Once fully tracked, the tracking of the structure is completed and the information produced by the tracking may be used in any way desired. Typically, the tracked structure will be displayed in the display of the tracking apparatus 26 to facilitate doctor's diagnosis.

Figure 6:
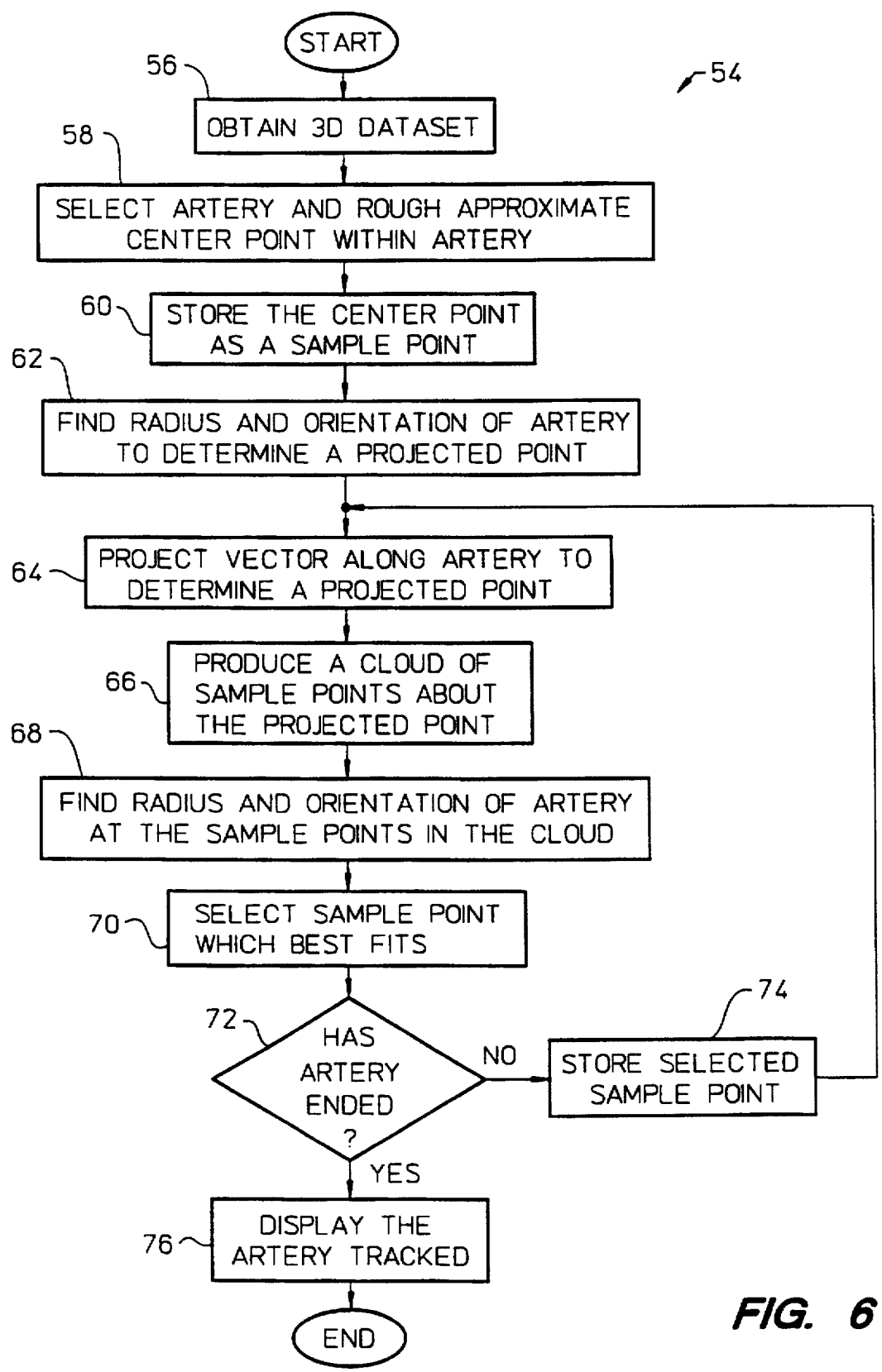
FIG. 6 is a flow chart of a first embodiment of a method according to the invention.

FIG. 6 is a first embodiment of a tracking method 54 according to the invention. The processing begins by obtaining 56 a dataset of MRI data. Next, a user selects 58 an artery at a point within the artery which roughly approximates the center point. The center point is stored 60 as a sample point.

Next, the radius and orientation of the artery are determined 62 at the center point using the transformation matrix. This processing is similar to the processing performed in block 46 of FIG. 5.

Upon completion of block 62, a subsequent center point is determined by projecting 64 a vector along the artery to produce a projected point. This processing basically follows the processing performed in block 48 in FIG. 5. Given the projected point, the processing produces 66 a cloud of sample points about the projected point. Each of these points is then checked for various radii and orientations to determine which point yields the maximized filter response. Next, the sample point within the cloud which yields the best response is selected 70 as the subsequent point. In the implementation used to test the invention, the cloud utilized was a 3×3×3 square volume (i.e., 27 points).

Thereafter, decision block 72 determines whether the artery has ended. If not, the selected sample point is then stored 74 and the tracking method 56 repeats blocks 64 through 74 until the artery ends. Once the artery has ended, an artery which has been tracked is displayed 76 on the display 34. For example, a visually distinct line can be drawn through the artery being tracked so as to avoid confusion in viewing the three-dimensional data. In another example, only the three-dimensional data surrounding the artery could be displayed thus isolating the artery data from other data. In yet another example, a superimposed tube could be drawn in the three-dimensional data to model and identify the artery tracked. Still another way to display a tracked structure is to use a ruled spline surface as described in U.S. application Ser. No. 08/228,050, entitled "Method and System for Viewing Three-Dimensional Data for a Structure", and filed concurrently herewith, which is hereby incorporated by reference.

The many features and advantages of the invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A digital filter having six-degrees of freedom, said filter operates to filter three-dimensional data having varying intensity, said digital filter comprising:

a set of filter coefficients arranged in a predetermined geometric shape;

sampling means for sampling the three-dimensional data at three-dimensional locations of each of the filter coefficients to produce a filter response for a given orientation; and transformation means for altering at least the orientation and scale of the geometric shape of said set of filter coefficients about a central three-dimensional location in the three-dimensional data to identify at least an orientation corresponding to a maximized filter response.

2. A finite impulse response filter as recited in claim 1, wherein said transformation means further translates the geometric shape of the filter coefficients from a base location to the central three-dimensional location.

3. A finite impulse response filter as recited in claim 1, wherein the filter is used to track a structure through the three-dimensional data, and wherein the central three-dimensional location is an approximate medial axis of the structure being tracked.

4. A spatial filter including having six-degrees of freedom, said filter operates to filter three-dimensional data having varying intensity, said spatial filter comprising:

a first tier including a first geometric shape having a first set of filter coefficients, and a second geometric shape having a second set of filter coefficients;

a second tier including a third geometric shape having a third set of filter coefficients, and a fourth geometric shape having a fourth set of filter coefficients;

means for altering the six-degrees of freedom of said filter, wherein said first and second geometric shapes being in a first plane, the third and fourth geometric shapes being in a second plane, and the first and second planes are parallel.

5. A spatial filter as recited in claim 4, wherein said first and second geometric shapes are coplanar.

6. A spatial filter as recited in claim 4, wherein said first set of filter coefficients are arranged in a first two-dimensional circle with radius r, and said second set of filter coefficients are arranged in a second two-dimensional circle with radius 1/r, where r is a positive real number, and wherein the first and second two-dimensional circles are concentric with one another.

7. A spatial filter as recited in claim 4, wherein the first and second geometric shapes are substantially the same.

8. A method for tracking a three-dimensional structure defined within a data set including data representing three spatial dimensions, using an image processing device, said method comprising:

selecting a digital filter having first and second tiers which are each at least two-dimensional and are separated along a third independent spatial dimension;

approximating a medial axis point in the three spatial dimensions for the structure to be tracked;

using the image processing device to compare the digital filter with the data set and ascertain a rotational orientation of the digital filter about at least one of the three spatial dimensions, that causes the digital filter to correspond to the three-dimensional structure; and approximating a next medial axis point for the structure based on the previous medial axis point and the orientation of the digital filter.

9. A method for tracking a three-dimensional structure defined within a data set including data representing three spatial dimensions, using an image processing device, said method comprising:

selecting a geometric shape that occupies at least two independent dimensions;

approximating a medial axis point in the three spatial dimensions for the structure to be tracked;

obtaining a best fit between the structure and the geometric shape by three-dimensional processing using at least one of adjusting size of the geometric shape in at least two independent dimensions to thereby cause the shape to correspond to the structure, and also ascertaining a rotational orientation of the shape around one of the at least two independent dimensions such that the shape corresponds to the structure, or adjusting position of the geometric shape within the three spatial dimensions and also ascertaining a rotational orientation of the shape around at least two independent axes such that it corresponds to the structure; and approximating a next medial axis point for the structure based on the best fit and the orientation of the geometric shape.

10. A method according to claim 9, wherein obtaining a best fit includes:

applying a digital filter to the data represented by the geometric shape; and readjusting size of the digital filter along each of two independent dimensions of the digital filter and repeatedly comparing the filter to the structure while varying size to optimize filter response.

11. A method according to claim 10, wherein obtaining a best fit also includes:

readjusting a position of the digital filter in three-dimensional space and repeatedly comparing the filter to the structure while varying the position and size to optimize filter response.

12. A method according to claim 9, wherein obtaining a best fit includes:

applying a digital filter to the data represented by the geometric shape; and readjusting a position of the digital filter in three-dimensional space and repeatedly comparing the filter to the structure while varying the position to optimize filter response.

13. A method according to claim 9, wherein obtaining a best fit also includes readjusting the digital filter in at least five degrees of freedom, including in position along three spatial dimensions of the data and around two rotational axes of the geometric shape, to obtain the best fit.

14. A method according to claim 9, wherein approximating a next medial axis point includes:

determining a projected axis point out from the best fit a distance in response to the orientation; and approximating the next medial axis point for the structure based on the projected axis point.

15. A method according to claim 9, wherein approximating the next medial axis point includes:

approximating a temporary medial axis point in the data;

performing a constrained search in the immediate vicinity of the temporary medial axis point; and selecting as a result of the constrained search the next medial axis point.

16. Software stored on machine-readable media which tracks a three-dimensional structure defined within a data set including data representing three spatial dimensions, said software directing an image processing device to:

select a geometric shape that occupies at least two independent dimensions;

approximate a medial axis point in the three spatial dimensions for the structure to be tracked;

obtain a best fit between the structure and the geometric shape by three-dimensional processing using at least one of adjusting size of the geometric shape along at least two independent dimensions to thereby match the structure, and also ascertaining a rotational orientation of the shape around one of the at least two independent dimensions such that the shape corresponds to the structure, or adjusting position of the geometric shape in the three spatial dimensions, and also ascertaining a rotational orientation of the shape around at least two independent axes such that it corresponds to the structure; and approximate a next medial axis point for the structure based on the best fit and the orientation of the geometric shape.

17. Software according to claim 16, wherein said software directs the image processing device to:

apply a digital filter to the data represented by the geometric shape; and readjust size of the digital filter along two independent dimensions and repeatedly compare the filter to the structure while varying the size to optimize filter response.

18. Software according to claim 17, wherein said software further directs the image processing device to:

readjust a position of the digital filter in three-dimensional space and repeatedly compare the filter to the structure while varying the position and size to optimize filter response.

19. Software according to claim 16, wherein said software directs the image processing device to:

select a geometric shape that is a three-dimensional digital filter; and ascertain a rotational orientation by selecting a rotational orientation of the filter which produces a maximized filter response.

20. Software according to claim 16, wherein said software further directs the image processing device to obtain a best fit by readjusting the digital filter in at least five degrees of freedom, including in position along three spatial dimensions of the data and about two rotational axes of the geometric shape, to thereby obtain the best fit.

21. Software according to claim 16, wherein said software directs the image processing device to approximate a next medial axis point by:

determining a projected axis point out from the best fit a distance in response to the orientation; and approximating the next medial axis point for the structure based on the projected axis point.

22. Software according to claim 16, wherein said software directs the image processing device to approximate the next medial axis point by:

approximating a temporary medial axis point in the data;

performing a constrained search in the immediate vicinity of the temporary medial axis point; and selecting as a result of the constrained search the next medial axis point.

* * * * *